Dec. 19, 1939. D. L. WOOD 2,183,523
VIEW FINDER
Filed Oct. 8, 1937
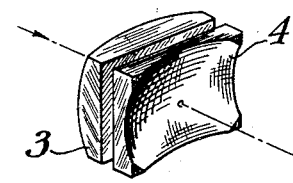
FIG. 2.
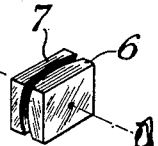
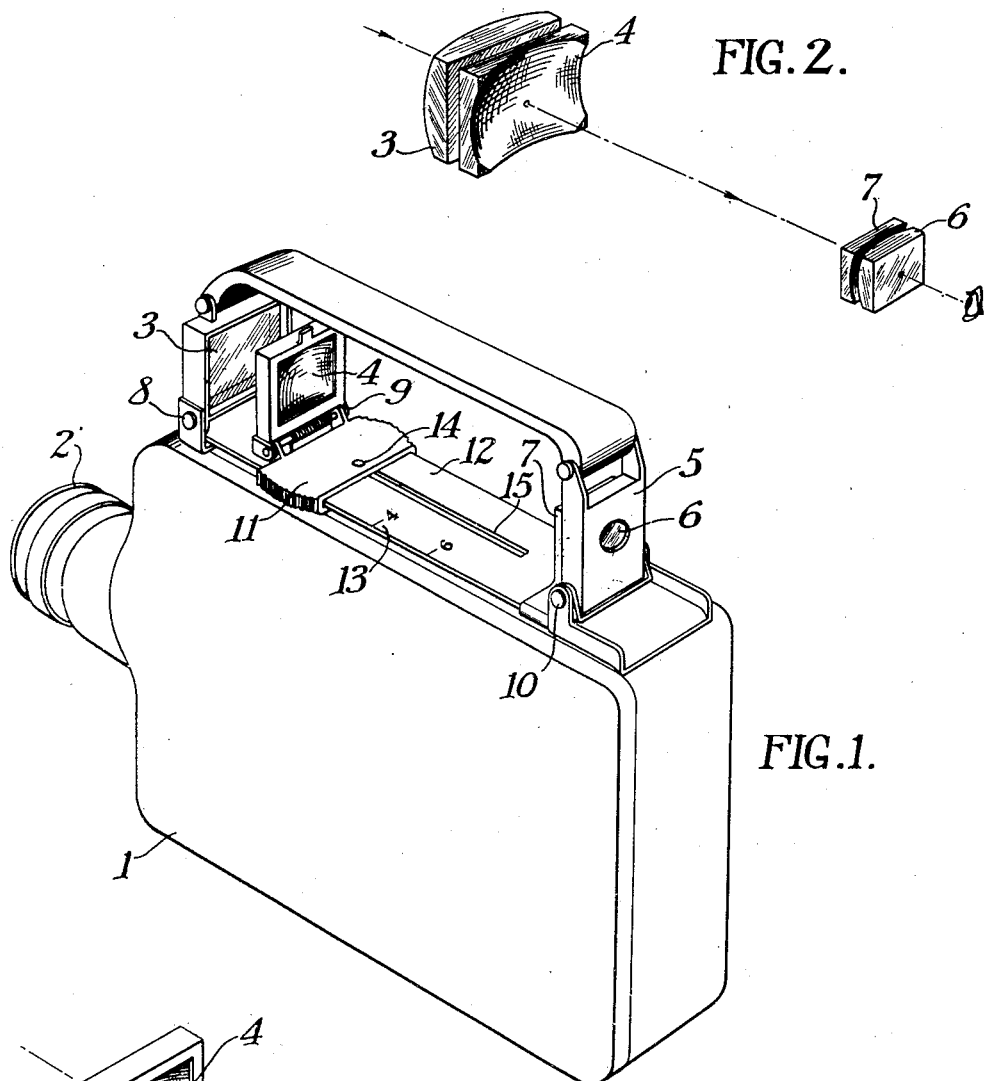
FIG. 1.
FIG. 3.
Donald L. Wood
INVENTOR
ATTORNEYS Patented Dec. 19, 1939

2,183,523

UNITED STATES PATENT OFFICE 2,183,523

VIEW FINDER

Donald L. Wood, Rochester, N. Y., assignor to Eastman Kodak Company, Rochester, N. Y., a corporation of New Jersey Application October 8, 1937, Serial No. 167,991

3 Claims. (Cl. 88—1.5)

The invention relates to view finders for use with photographic cameras and particularly to adjustable view finders in which the field of view can be altered to correspond to interchangeable lenses of different focal lengths.

In U. S. Patent 2,043,900, which issued June 9, 1936, Mihalyi describes an adjustable view finder of this type particularly suitable for use on a motion picture camera but not restricted to such use. When using a finder as therein described, the front component comprising a fixed element and an adjustable element axially spaced therefrom, forms a virtual image of any subject viewed, at a distance which varies with the movement of the adjustable element. This image when viewed through a fixed eye-piece appears at correspondingly varying distances which are accommodated for by the eye of the observer.

It is an object of the present invention to eliminate the necessity of the eye accommodating itself to various distances and thus to eliminate any eye strain which arises particularly when the adjustable front component is set at one of its extreme positions.

More specifically, it is an object of the invention to provide an eye-piece or ocular which reimages the image formed by the front component at a fixed distance independent of the adjustment of the front component.

According to the invention, a view finder having an adjustable front component for varying the field of view is also provided with an adjustable eye-piece to compensate for the change in focusing power of the front component when so adjusted. In the preferred embodiment of the invention, the front component comprises a movable negative element behind a fixed relatively weak positive element, the eye-piece comprises a movable negative element in front of a fixed positive element and there is a mechanical coupling between the two movable elements so that as the front component is adjusted, the eye-piece is adjusted in predetermined relation thereto, giving substantially constant focusing power to the whole finder. This provides that the image as viewed by the observer's eye appears always at a comfortable distance, for example, at optical infinity if the finder is an exact inverted Galilean telescope.

Other objects and advantages of the present invention will be fully understood from the following description when read in connection with the accompanying drawing in which:

Fig. 1 shows a motion picture camera incorporating the invention.

Fig. 2 is a perspective view of the optical components of the view finder shown in Fig. 1.

Fig. 3 is a detailed drawing of the manner in which the movable elements of Figs. 1 and 2 are mechanically coupled.

In the drawing similar reference numerals refer to similar features in the three figures. Referring thereto, a camera 1 provided with an interchangeable lens 2 has a view finder made up of a front component comprising elements 3 and 4 and an eye-piece 5 made up of components 6 and 7. As discussed in the above-mentioned patent, the various components of the finder are hinged at the points 8, 9, and 10 to permit convenient collapsing of the view finder system. The element 4 which is adjustable to give various fields of view is carried by a slide 11 which is movable on a track 12 and may be set in accordance with a scale 13 engraved thereon.

According to the present invention the eye-piece is also adjustable, and preferably comprises a movable element 7 in front of a fixed positive element 6. The movement of this element is controlled by a pin 19 mounted on one arm of a bellcrank lever 16 pivoted about a point 17 as shown most clearly in Fig. 3. The motion of this bellcrank lever is controlled by a pin 14 secured to the slide 11 which carries the adjustable element 4, which pin 14 slides in a groove 15 in the track 12. As the adjustable element 4 is set in accordance with the scale 13, the pin 14 moving along the slide 15 engages a cam surface 18 of one arm of the bellcrank lever 16 and rotates this lever a predetermined amount.

As the separation between the front components 3 and 4 is increased, the field of view of the finder is decreased to correspond to the field of interchangeable objectives of longer focal length. This front component comprising elements 3 and 4 is negative and forms a virtual image of any subject viewed at a distance in front of the camera which depends upon the spacing between these elements 3 and 4. For most purposes the position of this image is such that a simple positive lens is sufficient for an ocular since the eye of the observer can accommodate itself to take care of the different image distances. However, at extreme separation of the front elements, a certain amount of eye strain is introduced unless the focusing power of the ocular is correspondingly reduced by increasing the separation between the elements 6 and 7. In one embodiment of the invention, the view finder is arranged as an exact inverted Galilean telescope which is an afocal system having zero "focusing power" (as distinguished from positive or negative magnifying power). In this case, the adjustment of the eye-piece is such that its focal plane is always made coincident with the plane of the virtual image formed by the front component of the finder. However, in the more general embodiment of the invention, the final image presented to the eye is not virtually at infinity but virtually at some other comfortable distance, say 12 inches. To do this, the ocular is adjusted so that its focal plane is always a predetermined distance in front of the plane of the virtual image formed by the front component and so that this virtual image and the viewing plane distance (12 inches) are always conjugate to each other with respect to the eye-piece.

There is thus provided for the first time, a view finder having an adjustable field of view, but constant focusing power so that the image viewed by the observer's eye is always at a comfortable distance. The invention may also be applied to finder systems in which real images are formed by the front component. In fact, the various lens elements may be compound, the arrangement of these elements may be varied in numerous ways as will be obvious to those skilled in the art and under some circumstances the eye-piece may be adjustable as a unit rather than made up of a fixed and a movable element, without departing from the spirit of the present invention. For example, either or both of the positive elements may be movable instead of the negative ones; the relative positions of the positive and negative elements may be interchanged or any equivalent means of coupling the movement of the adjustable element or portion of the front component to the movement of the adjustable portion of the eye-piece would, of course, come within the scope of the present invention. On the other hand, the arrangement described is a most practical and simple one serving admirably to fully illustrate the principle of the invention and a preferred method of practicing it. It will be understood that it is not limited to the specific structure shown but is of the scope of the appended claims.

What I claim and desire to secure by Letters Patent of the United States is:

1. A view finder system for viewing a subject and adapted to have an adjustable field of view to correspond to camera lenses of different focal lengths comprising two separately and axially movable dispersive components spaced between two fixed collective components, the front pair of collective and dispersive components forming a virtual image of the subject at a distance varying with the spacing between the two front components and the rear pair of components reimaging said virtual image to form another virtual image, and means controlling the spacing of the front pair of components and the spacing of the rear components in predetermined relation whereby said other virtual image remains at a fixed distance from the rear fixed component.

2. A view finder system for viewing a subject and adapted to have an adjustable field of view to correspond to camera lenses of different focal lengths comprising two separately and axially movable dispersive components spaced between two fixed collective components, the front pair of collective and dispersive components forming a virtual image of the subject at a distance varying with the spacing between these two front components, and the rear pair of components reimaging said virtual image to form another virtual image, and means controlling the axial position of both of the movable components, said means including a pivoted bellcrank, one arm of which is connected to the rear movable component and the other arm of which constitutes a cam surface extending into the path of and engaged by the front movable member whereby movement of the front movable component oscillates the bellcrank about its pivot to move the rear movable component.

3. An adjustable view finder for viewing a subject more than two feet away therefrom comprising a field of view defining means, an adjustable negative front component including axially spaced positive and negative lenses, means for adjusting the axial spacing thereof so that the component forms a virtual image of the subject at a distance which changes with the adjustment, an adjustable ocular for reimaging virtually the virtual image at a distance within the range in which it may be comfortably viewed, said ocular also including axially spaced positive and negative lenses and means for adjusting the axial spacing and mechanical means coupling the two adjusting means in such predetermined manner that the reimage distance is within said range for all adjustments of the front component.

DONALD L. WOOD.